Aug. 14, 1945.  E. FAIRCLOUGH  2,382,621
PROCESS OF MAKING BATTERY SEPARATORS
Filed July 31, 1942
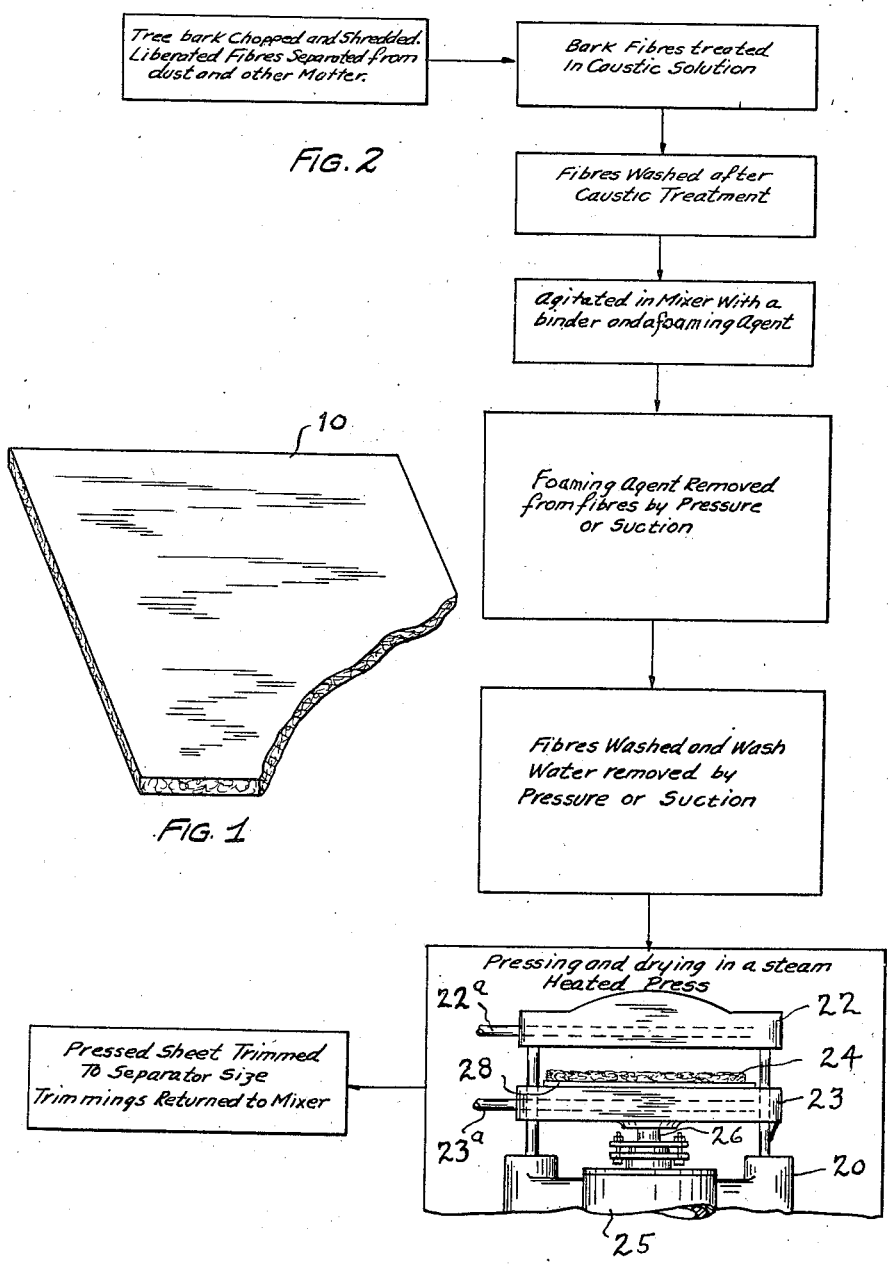
INVENTOR.
EDWARD FAIRCLOUGH
BY
Kwis Hudson & Kent
ATTORNEYS Patented Aug. 14, 1945

2,382,621

UNITED STATES PATENT OFFICE 2,382,621

PROCESS OF MAKING BATTERY SEPARATORS

Edward Fairclough, Cleveland, Ohio, assignor to Willard Storage Battery Company, Cleveland, Ohio, a corporation of West Virginia Application July 31, 1942, Serial No. 453,087

7 Claims. (Cl. 136—150)

This invention relates to the manufacture of storage battery separators and as one of its objects aims to provide a novel process for making battery separators from tree bark fibers.

Another object of the invention is to provide a novel process for making battery separators from treated tree bark fibers and a binder.

The invention may be further briefly summarized as consisting in certain novel steps of procedure hereinafter described and particularly set out in the appended claims.

This application is in part a continuation of my earlier application Serial No. 405,062 filed August 1, 1941, and now Patent No. 2,314,203 issued March 16, 1943.

In the accompanying sheet of drawings,

Fig. 1 is a perspective view partly in section showing a storage battery separator made of matted tree bark fibers and produced by my novel process; and Fig. 2 is a view more or less diagrammatic in form and indicating process steps for producing battery separators or the like according to my invention.

In Fig. 1 I show a separator 10 for use between the adjacent positive and negative plates of a storage battery and which is in the form of a sheet made of matted tree bark fibers. The separator may be of size and thickness suitable for the battery in which the separator is to be used. In making the separator 10 I prefer to use bark fibers obtained from trees of the Sequoia group such as the redwood trees because the fibers obtained from the bark of these trees are sufficiently long to secure satisfactory matting or felting and possess other desirable characteristics, but I may use fibers obtained from the bark of various other trees if the fibers are of suitable length. Redwood bark fibers also have a crinkly character which materially aids in matting or felting these fibers.

In forming the separator the fibers are matted together and pressed into a sheet, and although the fibers do have sufficient adhesive qualities to permit such separators to be successfully produced without the use of a binder, I prefer to use a binder to aid in keeping the fibers from falling apart. Any suitable substance may be used as a binder such as latex, hard rubber dust, or asphalt. I find that a variety of natural asphalt known as "gilsonite," which is found in the Uinta Valley, Utah, and occurs generally as rounded masses of brilliant black solid hydrocarbon, forms a very satisfactory binder. I also find that certain resins make satisfactory binders providing they are acid resistant and do not introduce any undesirable matter into the electrolyte solution. One such resin is a pine resin known commercially as "Vinsol." Suitable synthetic resins could also be used such as styrene and vinylydene chloride. When a binder, of the kind already mentioned, is employed it should be used in a relatively small amount so as not to interfere with or detract from the absorbent qualities of the separator.

In some instances it may be desirable to add jute fibers or other vegetable or mineral fibers to the tree bark fibers, instead of one of the above-mentioned binders, to give the separators initial strength so that they can be handled satisfactorily. I may also carry out certain steps of my process with the fiber mat disposed between sheets of paper which give added strength to the mat and facilitate the handling thereof. These sheets of paper may be peeled or stripped from the mat or finished separator at the desired time, preferably just before the separator is to be placed in the battery, although in some cases the paper sheets may be left on the separator so as to be incorporated in the battery in which the separator is placed.

I have found the fibers obtained from the bark of redwood trees to be especially suitable for making battery separators because they are sufficiently long fibers which will form a good mat without the use of any binder whatever, particularly after the caustic treatment hereinafter described, and will form an excellent mat with only a limited amount of binder. The redwood bark fibers also have a high lignin content which not only adds to the life of the separator and makes it resistant to acid but is known to be a desirable substance in a storage battery because it tends to prolong the life of the battery and enables it to maintain a favorable capacity rating. The redwood bark fibers have a desired resiliency, probably because of their crinkly character, and when incorporated in a battery separator, cause the separator to swell or expand and maintain contact with the positive plate so as to prevent loosening or shedding of the active material. Another desirable characteristic of the redwood bark fibers is that they do not hydrolyze appreciably in acid. Various materials, particularly cellulose, tend to lose their strength and resiliency in acid, but redwood bark fibers contain a relatively small amount of cellulose and probably for this reason possess the quality of resisting hydrolysis. I also find that battery separators made from redwood bark fibers have a satisfactory low electrical resistance.

In making storage battery separators from redwood bark or other suitable tree bark, the bark is stripped from the tree, chopped into pieces of convenient size, and passed through a shredding apparatus which liberates the fibers. The shredded material is cleaned as by screening or any other suitable operation to separate the fibers from the dust, dirt, and other matter. The shredding and separation of the fibers from the other matter are preferably carried out with the material in a dry or natural state. The bark fibers thus obtained are relatively long and more or less round and crinkly in form.

The bark fibers are then subjected to a treatment in a caustic solution which removes various impurities such as resins, miscellaneous organic material, small amounts of manganese, and various other ingredients that would prove harmful to storage battery plates. In carrying out this treatment, the bark fibers may be placed in a filter vessel or container, which may be cheesecloth and which retains the fibers and permits the treating liquid to circulate through the mass. While the fibers are retained in the filter vessel or container they are subjected to cooking in a 1% or 1½% caustic solution (sodium hydroxide) at a temperature of about 190° or 200° F. The fibers are usually left in the caustic solution for a period of one to four hours, although the time of treatment may be greater or less than this, depending upon the character of the fibers, and are then removed and thoroughly washed to get rid of the caustic solution. This caustic treatment apparently removes very little, if any, of the cellulose from the fibers, although the treatment may reduce the weight of the fibers by approximately 25% or 30%.

The washed fibers are next placed in a mixer together with a wetting or foaming agent and the desired binding material, if one is to be used. The fibers may be dried before being placed in the mixer or may be placed therein in the wet condition in which they come from the washing operation following the caustic treatment. The foaming agent should be a substance which will wet the fibers individually and will also produce a foam so that the fibers will separate or be held apart and will not remain in lumps or clots. Although various substances can be used for this purpose, those compounds or salts chemically known as neutral soaps or detergents, and also known as foam producing wetting agents, are preferred. This foaming agent or so-called "soap solution" is preferably a 1% solution although this value may be increased or decreased somewhat as circumstances may require. As the above mentioned foaming and wetting agent any one of a large group of available substances of this kind can be used. As being representative of this class, the following substances or preparations can be mentioned: soap bark; "Acquerex" which consists of sodium salts of sulphate mon-esters of a mixture of higher fatty alcohols; "Nacconol" which is the trade name for what is believed to be alkyl aryl sulphonate; "Saponin" which is an extract of the bark of Quillaja root or Indian chestnut; "Tergitol penetrant" which is a sodium salt of higher secondary alkyl sulfate; "Aerosol" which is an alkyl aryl sulfonate; "Orvus" which is a fatty alcohol sulfate; "Dreft" which is also a fatty alcohol sulfate; "Aresklene" which is dibutyl phenyl phenol sodium disulfonate; "Santomerse" which is alkylated aryl sulfonate; "Nekal A" which is sodium alkyl naphthalene sulfonate; and "Daconol" which is alkyl aryl sodium sulfonate.

As stated above, the binder is also placed in the mixer and during the mixing operation the binder becomes thoroughly distributed among the fibers. The binder should be either in a powdered or granular form, and the grains or particles should not be of a larger size than that corresponding with a 35 mesh screen and should not be finer than 100 mesh. Instead of a powdered or granular binder, I can use certain synthetic resins in thread or filament form. Any one of the binders above mentioned may be used, but I prefer to use the natural asphalt known as gilsonite which is insoluble in water. The amount of binder to be used should be relatively small, as mentioned above, so as not to decrease the absorbent properties of the matted fibers. I find that the use of 10% to 20% by weight of the binder gives good results although the amount used can be varied somewhat and can be more or less than the percentage mentioned.

The mixing operation need be continued only a few minutes, but the mixing period will depend on the speed of the mixer, its size, and the amount and character of the material being treated, as well as various other factors. The temperature of the foaming agent or soap solution will also affect the period of mixing because a higher temperature will increase the speed at which the foam is produced during the mixing.

As an example of the mix employed in my process and from which I have obtained a very satisfactory battery separator, I mix together 3¼ pounds of the tree bark fiber, 14 pounds of water, 209 grams of gilsonite, and 340 cc. of 10% solution of the foaming agent. This amount of a 10% solution of the foaming agent when mixed with the 14 pounds of water produces approximately ½% solution, by weight, of the foaming agent.

A general formula based on the weight of the total mix may be stated as follows: 17½% fiber, 2½% gilsonite, and 80% water, the latter being a ½% solution of the foaming agent.

The amounts of the ingredients specified in the above example and formula can be varied and can be greater or less than stated, depending upon the characteristics of the fiber, the kind of foaming agent employed, and various other factors.

From 18½ pounds of the above-specified mix I find that I can produce 10 sheets or separators having a total area of approximately 16 square feet with a thickness of about .095" and a density of .23 pounds per square foot.

Following the treatment of the tree bark fibers in the mixer, the foaming agent or soap solution is removed from the fibers. This may be accomplished in part by placing a mat or layer of the fibrous material on a screen through which the liquid may drain. Most of the liquid remaining in the fibrous material may then be removed by subjecting the material to a squeezing operation in a suitable press. Instead of this squeezing operation, suction can be applied to the material while supported on the screen to draw the liquid therefrom.

After the removal of the foaming agent or soap solution from the fibrous material it may be subjected to a washing operation. This may be accomplished by spraying wash water onto the mat or layer of fibrous material while it is supported by a screen. The wash water is removed from the mat or layer either by the application of pressure or suction as explained above in the removal of the foaming agent or soap solution. The step of washing the fibrous material can be omitted if desired.

The mat or layer remaining after the removal of the foaming agent or soap solution (or the removal of the wash water) is still damp or wet and is next subjected to a drying and molding operation. At this time the damp mat can be placed between two sheets of paper, although the use of paper is not necessary and can be omitted if desired. The mat, with or without the paper sheets, is then transferred to a press, such as the press 20 shown in Fig. 2, in which it is subjected to heat and pressure. Instead of placing the mat immediately in the press 20, it can, if desired, be placed on a hot plate while waiting for the pressing operation and during this interval of time some of the liquid would be evaporated from the material so as to shorten the time required for the pressing operation. Instead of using a press, the material might also be subjected to pressure between heated rolls. The pressure which is applied to the material compresses or molds the same into a sheet of a thickness suitable for battery separators. The heat which is applied to the material serves to dry the same by evaporating the moisture therefrom and also serves to soften the binder so that it will adhere to the fibers and hold them together. The gilsonite or natural asphalt which I have mentioned above as being a satisfactory binder has a relatively high melting point and thus permits a relatively high temperature to be used in the press which expedites the drying of the material. The temperature at which the material is heated should preferably be just below the melting point of the binder so that the binder will be softened but will not actually flow. I find that a temperature in the neighborhood of 335° or 340° F. is very satisfactory in the pressing and drying operation when gilsonite is used as the binder but this temperature may be increased or decreased with the use of different binders and as different conditions may require.

So far as I am aware, the feature of incorporating a binder in granular or powdered form in a mass of fibers and pressing or molding the mass while heated to a temperature which is below the melting point of the binder but which softens the binder to secure adhesion of the fibers, is broadly new and is applicable to the manufacture of various products other than storage battery separators. Moreover, this feature is applicable to other fibers than tree bark fibers; for example, it can be applied to the manufacture of battery separators, fiber board, and various other products from bagasse, cocoanut fibers, wood fibers, and other vegetable and mineral fibers.

When a press such as the press 20 is used for the pressing and drying operation, it may be of any suitable construction such as that shown in Fig. 2. As here illustrated, the press may comprise stationary and movable platens 22 and 23 between which a layer or mat 24 of the material is received. Steam or other suitable heating agent may be supplied to the platens by conduits 22a and 23a. A cylinder 25 incorporated in the base of the press is provided with a piston which is connected with the movable platen 23 by the piston rod 26 so that when the piston is actuated hydraulically or otherwise, the platens will subject the material to a desired pressure which may be in the neighborhood of 500 lbs. per square inch.

The thickness of the sheet into which the matted material 24 is compressed or molded may be determined by the height or thickness of a suitable mold or mold ring 28 in which the material is placed.

The sheet obtained from the pressing and drying operation is then trimmed to the size and shape desired for the battery separator 10 and the fiber trimmings resulting from this operation are salvaged and returned to the mixer.

From the foregoing description and accompanying drawing it will be readily understood that I have provided a novel process by which storage battery separators can be economically produced from wood bark fibers, such as the fibers of redwood bark which has heretofore been regarded more or less as waste material.

Having thus described my invention, I claim:

1. The process of making battery separators which comprises treating tree bark fibers with caustic solutions, removing the caustic solution from the fibers, adding to the fibers a binder and a wetting and foam producing chemical solution, agitating the fibers and binder while in said wetting and foam producing chemical solution so as to distribute the binder and produce foam for holding the fibers apart, removing the chemical solution, and pressing the fibrous mixture into a sheet.

2. The process of making battery separators which comprises treating tree bark fibers with caustic solution, removing the caustic solution from the fibers, adding to the fibers a binder and a wetting and foam producing chemical solution, agitating the fibers and binder while in said wetting and foam producing chemical solution so as to distribute the binder and produce foam for holding the fibers apart, arranging the fibrous mixture to form a mat and removing the last-mentioned solution therefrom, and subjecting the mat to heat and pressure to form a sheet.

3. The process of making battery separators which comprises treating tree bark fibers with caustic solution, removing the caustic solution from the fizers, adding to the fibers a binder and a wetting and foam producing chemical solution, agitating the fibers and binder while in said wetting and foam producing chemical solution so as to distribute the binder and produce foam for holding the fibers apart, removing said last-mentioned solution, and subjecting the treated fibers to heat and pressure to dry the same and press them into a sheet.

4. The process of making battery separators which comprises treating tree bark fibers with caustic solution, washing the fibers to remove the caustic solution, adding to the fibers a wetting and foam producing chemical solution and a binder in granular or filament form, agitating the fibers and binder while in the last-mentioned solution so as to distribute the binder and produce foam for holding the fibers apart, removing said last-mentioned solution, and drying the treated fibers and pressing them into a sheet by applying heat and pressure thereto.

5. The process of making battery separators which comprises treating tree bark fibers with caustic solution, washing the fibers to remove the caustic solution, adding to the fibers a wetting and foam producing chemical solution and a binder in granular or filament form, agitating the fibers and binder while in the last-mentioned solution so as to distribute the binder and produce foam for holding the fibers apart, squeezing the resulting fibrous mixture for removing said last-mentioned solution therefrom, and drying the mixture and pressing it into a sheet by applying heat and pressure thereto.

6. The process of making battery separators which comprises treating tree bark fibers with caustic solution, removing the caustic solution, adding to the fibers a binder and a wetting and foam producing chemical solution, agitating the fibers and binder while in said wetting and foam producing chemical solution so as to distribute the binder and produce foam for holding the fibers apart, arranging the resulting fibrous mixture to form a mat and removing the last-mentioned solution, placing the mat between sheets of paper, and drying the mat and pressing it into a sheet by applying heat and pressure thereto.

7. The process of making battery separators which comprises treating tree bark fibers with a solvent to remove ingredients harmful to storage battery plates, removing the solvent, adding to the fibers a binder and a wetting and foam producing chemical solution, agitating the fibers and binder while in the last-mentioned solution so as to distribute the binder and produce foam for holding the fibers apart, removing said last-mentioned solution, and pressing the treated fibers into a sheet.

EDWARD FAIRCLOUGH.